Aug. 15, 1950

C. VAN AUSDALL 2,519,206

MILLING MACHINE ATTACHMENT

Filed May 16, 1947

INVENTOR.
Carl Van Ausdall
BY Zugelter & Zugelter
Attys.

Aug. 15, 1950  C. VAN AUSDALL  2,519,206
MILLING MACHINE ATTACHMENT
Filed May 16, 1947  2 Sheets-Sheet 2

INVENTOR.
Carl Van Ausdall
BY Zugelter & Zugelter
Attys.

Patented Aug. 15, 1950

2,519,206

UNITED STATES PATENT OFFICE 2,519,206

MILLING MACHINE ATTACHMENT

Carl Van Ausdall, Liberty, Ind.

Application May 16, 1947, Serial No. 748,536

4 Claims. (Cl. 90—17)

This invention relates to a milling machine attachment which may be used in conjunction with standard vertical milling machines, presently available upon the market.

One of the objects of the invention is to provide means whereby a milling machine of the vertical type may quickly be converted into a horizontal type of milling machine.

Another object is the provision of means for increasing the usefulness and efficiency of a vertical milling machine by enlarging its scope of operations, such as sawing, slab milling, straddle milling, and other operations of a horizontal nature not ordinarily obtainable on a vertical miller.

Another object is the saving of floor space in a machine shop or the like by providing means for making one machine do the work of two or more.

A further object of the invention is the provision of an improved construction sufficiently rigid and sturdy to permit of heavy and accurate horizontal milling operations upon a vertical milling machine.

Another object is to provide a device having the foregoing characteristics, and which is durable in construction, simple of operation, and low in cost of manufacture.

These and other objects and advantages are attained by the means described in the following specifications and illustrated upon the accompanying drawings in which.

Since in ordinary practice a vertical milling machine is limited in its scope of operations, those engaged in machine shop work have heretofore found it necessary to install a horizontal or a costly universal milling machine when called upon to meet certain requirements of milling machine work, a contingency naturally requiring additional floor space.

The device of the present invention precludes the necessity of installing such additional machinery, since it is adapted to convert, simply and quickly, a vertical milling machine into a horizontal milling machine. This device, after it has performed its functions as a horizontal miller, may be quickly detached, and the machine may again be used as a vertical miller.

Since one machine is thereby adapted to do the work of two or more, the saving in cost and floor space to a machine shop operator is obvious.

Figure 1:
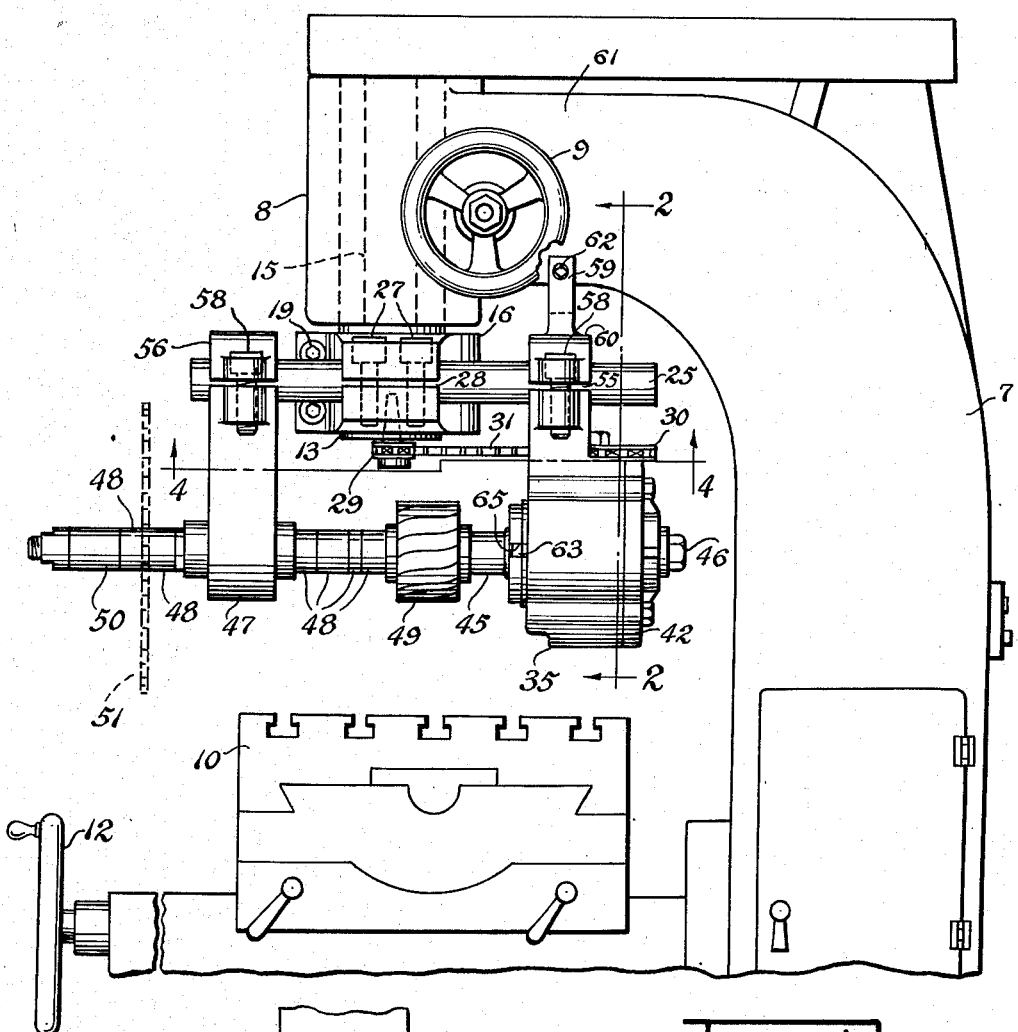
Fig. 1 is a fragmentary side elevational view of a vertical milling machine, showing the device of the present invention attached thereto.

Referring to Fig. 1, the column of a vertical milling machine is indicated at 7, while the spindle head is shown at 8 and a head control wheel at 9. Below the head is an adjustable work table 10, one of the table control wheels being indicated at 12.

The vertical spindle nose 13, in non-rotative but slidable engagement with a vertical bore in the head 8, may be lowered from and elevated into said head by means of the hand wheel 9. A rotating spindle 15, which is provided with a tapered socket 6 at its lower end, is disposed within the spindle nose 13. In regular practice, the tapered socket of the spindle carries a taper shanked cutter which acts upon work clamped to the table 10. As is obvious, the machine when so used is limited in the amount or kind of milling work that can be done upon it.

The application of the device of the present invention to the vertical milling machine, as shown in Fig. 1, obviously increases the elasticity of operations of said machine, including sawing, slab milling, straddle milling, and the like.

Figure 4:
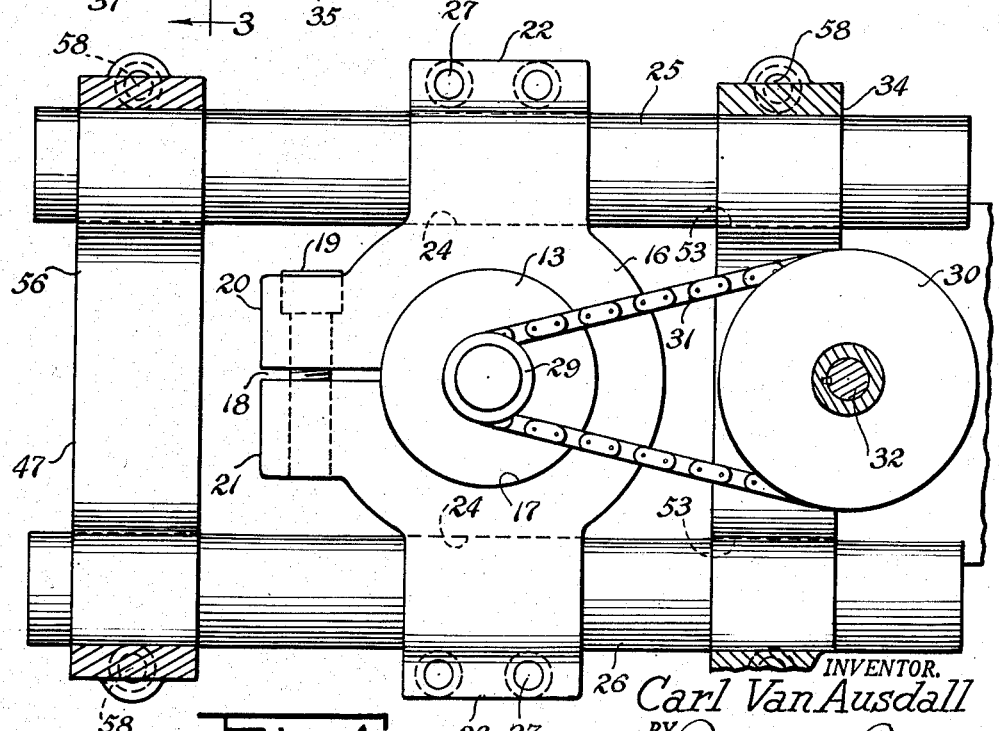
Fig. 4 is a horizontal cross sectional view taken on line 4—4 of Fig. 1.

A main block 16 (Fig. 4) provided with a split bore 17, substantially centrally thereof, is securely clamped against movement to the spindle nose 13, which has been lowered from the head 8 sufficiently to permit said clamping thereupon. The bore split is indicated at 18, in Fig. 4. Clamping may be effected by means of the clamping screws 19, inserted through apertures in the ear 20 of the main block and threaded into tapped holes in the opposite ear 21 of said block.

Laterally extending from each side of the main block 16 are the arms 22—23, each of said arms being horizontally apertured, as at 24, in substantial parallelism, for the reception therethrough of the support bars 25—26. These support bars are firmly clamped against movement by means of the screws 27 in a manner similar to that employed in clamping the main block to the spindle nose, the apertures 24 being split as at 28, Fig. 1.

Figure 2:
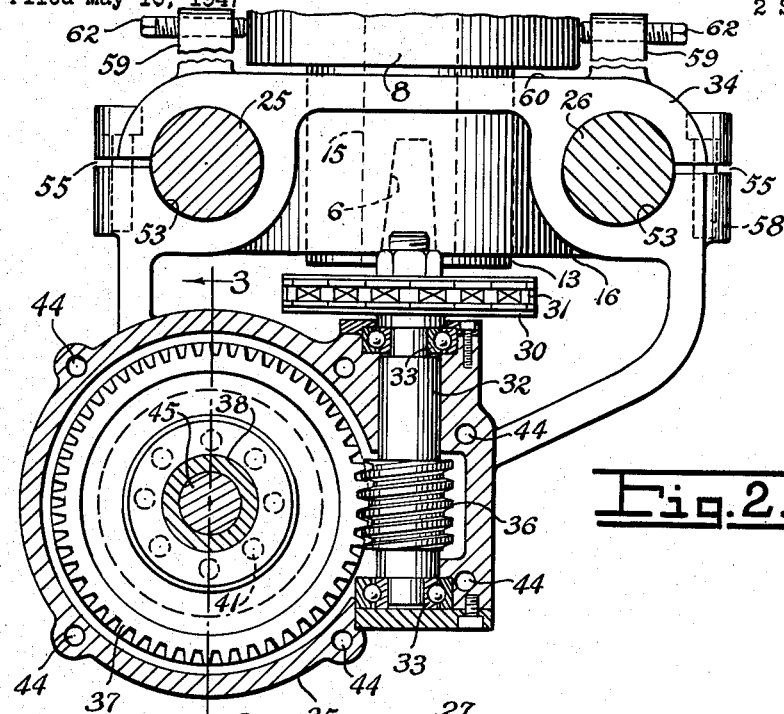
Fig. 2 is a vertical cross sectional view of the device, taken on line 2—2 of Fig. 1.

A sprocket 29, having a tapered shank to fit the tapered socket 6 in the spindle 15, is inserted into said socket. This sprocket 29 drives a second sprocket 30 by means of the chain 31. The driven sprocket 30 is keyed to a vertical gear shaft 32 which is stepped in suitable bearings 33 (Fig. 2) mounted in a gear housing 35. The gear housing may be integral with the gear housing bracket 34, supported from the bars 25—26.

Figure 3:
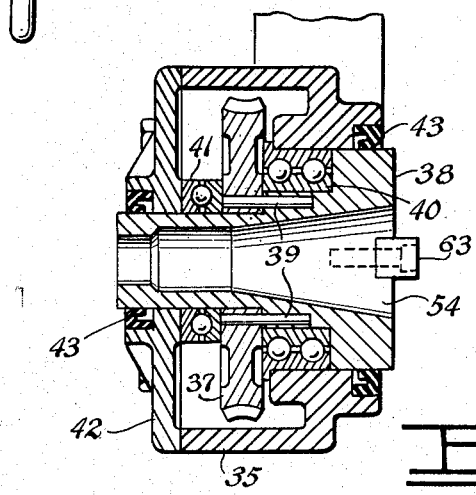
Fig. 3 is a cross sectional view taken on line 3—3 of Fig. 2.

Keyed to the gear shaft 32 is a worm 36 in mesh with the worm gear 37, said worm gear being mounted upon a horizontal spindle 38 rotatably journaled in the gear housing 35. As will be noted, the spindle 38 may be provided with a tapered bore 54 (Fig. 3) for frictional engagement therein of a tapered milling machine arbor of standard design. The worm gear 37 may be fixed to the horizontal spindle 38 in any suitable manner, as by means of pins 39 shown in Fig. 3. Anti-friction bearings, such as shown at 40, may be provided for mounting the horizontal spindle 38, while suitable thrust bearings 41 may be furnished for taking the thrust of said spindle. A cover plate for the gear housing is indicated at 42, said cover being held in place by means of screws threaded into the tapped holes 44, shown in Fig. 2. A suitable lubricant may be sealed within the gear housing 35 by means of suitable oil seal rings 43 surrounding each end of the horizontal spindle 38, as shown in Fig. 3.

The tapered end of a milling machine arbor 45, which may be of a standard design available upon the market, is inserted into the horizontal spindle 38 and held firmly therein by means of the draw bolt 46, shown in Fig. 1. The opposite end of the arbor 45 is journaled in an anti-friction bearing in the bearing bracket 47, said bracket being supported by the support bars 25—26. One or more milling cutters may be mounted upon the arbor 45 and selectively spaced thereon by means of the spacers 48. A key 63 fitted to the outer face of the horizontal spindle 38 cooperates with a notch 65 in a flange of the arbor 45 to preclude slipping of the arbor, the tapered end of which is in engagement with the tapered hole 54 of the spindle 38.

A cutter of the slab milling type is indicated at 49, between the bearing bracket 47 and the gear housing 35. As is obvious, a milling cutter, such as a saw, may be mounted upon the forwardly extending end 50 of the arbor, as shown in broken lines at 51.

Thus it will be seen that rotation of the vertical spindle 15 in the head 8 of the vertical milling machine will cause the horizontal spindle 38 and the arbor 45 to rotate, through the co-action of the sprockets 29 and 30 and the gears 36 and 37. Pulleys and a belt may be substituted for the sprockets and chain 31, if desired.

To detach the device from the spindle nose 13, it is necessary only to loosen the clamp screws 19 and to remove the sprocket 29 from the vertical spindle 15. The milling machine may then be used as originally intended, or as a vertical miller.

The upper portion of the gear housing bracket 34 is apertured as at 53—53, said apertures being parallel and in axial alignment with the apertures 24—24 in the main block 16. The gear housing apertures preferably are split, as at 55, to provide for clamping thereof upon the support bars 25 and 26. Likewise, the upper portion 56 is provided with split apertures 57—57, said apertures being parallel and in axial alignment with the corresponding apertures 24 and 53 in the main block and the gear housing, respectively. The bearing bracket 47 and the gear housing 35 are clamped to the support bars 25 and 26 by means of the screws 58, as shown upon the drawings, the main block 16 being interposed between said bearing bracket and gear housing.

Means for aligning the device square with the work piece upon the table 10 may be provided. In the exemplified form, a pair of upstanding lugs 59 may be provided upon the top face 60 of the gear housing bracket 34, adjacent the outer ends thereof, said lugs being disposed to straddle the lower portion of the milling machine neck 61 with substantial clearance therebetween. The lugs 59 are provided with set screws 62 in threaded engagement with said lugs, the screws being directed toward the neck 61 of the machine. Loosening one set screw and tightening the other, before tightening the clamping screws 19 on the main block 16, will result in achieving the proper alignment of the horizontal spindle and arbor with the work table 10.

Upon loosening the screws 27 and 58, the bearing bracket 47, main block 16, and the gear housing 35 may be moved along the support bars 25 and 26, as requirements of setting up the device may demand.

The device of the present invention has the advantage of being angularly adjustable relative to the axis of the vertical spindle 15, thereby to dispose the horizontal spindle 38 and arbor 45 at any desired angle transversely of the table 10. In a standard horizontal milling machine, the arbor and spindle axis is always at right angles to the longitudinal axis of the table 10.

As is apparent, the sturdy construction of the device will permit of heavier milling work and greater production than that obtained by milling machine attachments of former designs. Because of the novel principles employed, more accurate work will also result. In addition to these advantages, substantial savings to the machine shop operator will result from the fact that one machine may be made to perform a multiplicity of operations usually requiring the services of two or more machines resulting in a saving in cost of floor space, as well as in cost of equipment. Various other advantages will be apparent to persons skilled in the art to which the invention appertains.

It is to be understood, of course, that various modifications and changes in structural details may be made, within the scope of the appended claims, without departing from the spirit of the invention.

What is claimed is:

1. In an attachment for milling machines and the like having a vertical spindle and spindle nose, a main block, means for securing the main block to the spindle nose, horizontal support bars carried by the main block in spaced parallelism, a gear housing bracket and a bearing bracket depending from said support bars at opposite sides of the main block, a driving sprocket in engagement with the vertical spindle, a driven sprocket keyed to a vertical shaft journaled in said gear housing bracket, means for driving the driven sprocket, a worm keyed to said driven sprocket shaft, a horizontal spindle journaled in the gear housing, a gear mounted upon the horizontal spindle and in mesh with the worm, a horizontal arbor having one end in fixed engagement with the horizontal spindle and its other end journaled in the bracket bearing, and means for fixing milling cutters to the arbor for rotation therewith.

2. In an attachment for supporting a horizontal arbor on milling machines and the like having a vertical spindle and spindle nose, a main block, means adjustably securing the main block to the spindle nose, horizontal support bars carried by the main block in spaced parallelism, a gear housing bracket depending from said support bars, a sprocket in rotatable engagement with the vertical spindle of the milling machine, a vertical shaft journaled in the gear housing bracket, a second sprocket keyed to the vertical shaft, means connecting the second sprocket to the first sprocket for driving engagement therewith, a worm keyed to the vertical shaft, a horizontal spindle journaled in the gear housing bracket, a gear in mesh with the worm and fixedly mounted upon the horizontal spindle for rotation therewith, and means depending from the support bars for horizontally supporting one end of a milling machine arbor while its opposite end is in rotatable engagement with the horizontal spindle.

3. An attachment for horizontally supporting a rotating tool holding arbor comprising a centrally apertured main block, means for adjustably clamping said main block to the spindle nose of a vertical milling machine, support bars carried by the main block at substantially their center, a gear housing bracket depending from the support bars, a rotating shaft vertically journaled in said gear housing bracket, a worm keyed to said vertical shaft, a horizontal spindle rotatively mounted in said gearing housing, a worm gear fixedly mounted upon said horizontal spindle for rotation therewith and in mesh with said worm, means for rotating said vertical shaft upon rotation of the vertical spindle of the vertical milling machine, and means depending from said support bars for horizontally supporting one end of a tool holding arbor while its other end is in engagement with the horizontal spindle of the attachment.

4. A device for attachment to a vertical milling machine having a head, a rotating vertical spindle, and a spindle nose, said device comprising in combination, a pair of brackets including horizontally aligned bearings, and means for supporting said brackets in fixed relation to said head, a rotary horizontal arbor journalled in said bearings, and means including a reduction gear for power rotating the arbor from the spindle at a speed materially less than the speed of rotation of said spindle, said bracket supporting means being rotationally adjustable relative to the spindle nose, and means for maintaining adjusted positions of said bracket supporting means, including a pair of spaced arms on said supporting means loosely straddling the machine head, and opposed adjustment screws carried by said arms, and adapted to engage opposite sides of the head.

CARL VAN AUSDALL.

REFERENCES CITED

The following references are of record in the file of this patent:

UNITED STATES PATENTS

| Number | Name | Date |
|---|---|---|
| 1,029,402 | Ritter | June 11, 1912 |
| 2,475,227 | Evans | July 5, 1949 |